Jan. 19, 1943.  L. G. RANFT ET AL  2,308,934
PHOTOGRAPHIC CAMERA
Filed Aug. 2, 1939   5 Sheets-Sheet 1

Inventors
Ludwig G. Ranft
Franz Stömmer
By
Cumpston & Shepard
their Attorneys

Patented Jan. 19, 1943

2,308,934

UNITED STATES PATENT OFFICE 2,308,934

PHOTOGRAPHIC CAMERA

Ludwig G. Ranft, Munich-Solln, and Franz Stömmer, Munich, Germany; vested in the Alien Property Custodian Application August 2, 1939, Serial No. 288,014
In Germany August 5, 1938

13 Claims. (Cl. 95—31)

This invention relates to photographic cameras and especially to cameras having objective shutters of the "set" type as distinguished from the "automatic" type; that is, shutters in which a separate tensioning or setting operation is necessary before the shutter can be tripped or released to make an exposure. More particularly, the present invention relates to cameras having shutters of the above mentioned type and also having one accessible and manually operable member for winding the film, a second accessible and manually operable member for setting the shutter (as distinguished from those cameras in which the film is wound and the shutter is set by operation of a single member), and a third accessible and manually operable member for tripping or releasing the shutter to make an exposure.

An object of the invention is the provision, in a camera of the above defined type, of interlocking means requiring that the film winding member and the shutter setting member be operated in a predetermined order or sequence, and locking the shutter release or tripping member against a tripping actuation until both the film winding member and the shutter setting member have been properly actuated, and locking the film winding member, when once it has been actuated, against a second operation until the shutter has again been tripped to make a new exposure. The provision of such means prevents wastage of film either by making a "double exposure," or by feeding the film twice after one exposure, so that an unexposed section of film is fed through the camera.

Another object of the invention is the provision of a camera of the above defined type in which either the film feeding member or the shutter setting member is locked against actuation, following the making of an exposure, until the other has first been actuated, and in which the shutter release is locked against full actuation until the second of the aforementioned two members has been actuated.

Another object is the provision, in a camera of this type, of means controlled by the film winding member for locking the shutter setting member to hold it against setting movement after an exposure has been made, until the film winding member has first been operated, together with means for locking the shutter release member against full actuation until the shutter has been set.

Still another object is the provision, in a camera of this type, of locking means for the shutter setting member controlled by the film winding member and operating partly through the instrumentality of the shutter release mechanism.

A further object is the provision, in a camera of this type, of locking means for the film winding member which is at least partly dependent upon and controlled by the position of the shutter setting member.

A still further object is the provision of a camera of this type in which the position of the shutter setting member controls the locking and unlocking of the film winding member, and in which such locking or unlocking is accomplished in part through the medium of the shutter release mechanism.

A still further object is the provision of mechanism having the desirable interlocking features above outlined, which is simple to operate, and relatively inexpensive.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

The camera and its shutter, except for the interlocking parts particularly described below, may be of any conventional or known construction, the details of which are unimportant so far as the present invention is concerned, and need not be described further than to say that the camera casing is indicated in general at 31 (Fig. 1) and is provided with the usual film supply roll 33, and film winding roll 35, the latter being manually turned in the direction of the arrow by an accessible knob 37. The film, when properly threaded through the camera, extends from the supply roll to the winding roll as indicated at 39. An image window 41 defines the exposure area of the film. A metering roll 43 is provided with teeth 45 engaging in perforations in the film 39 so that the roll 43 must turn with the movement of the film when the knob 37 is turned, and the feeding knob cannot be turned if the metering roll 45 is held against movement. This metering roll, in the manner further described below, allows a definite predetermined length of film to be fed forwardly at each cycle of operation, and thus serves to space the images of successive exposures at the proper distance from each other.

Figures 5, 6, 7, 8, 11:
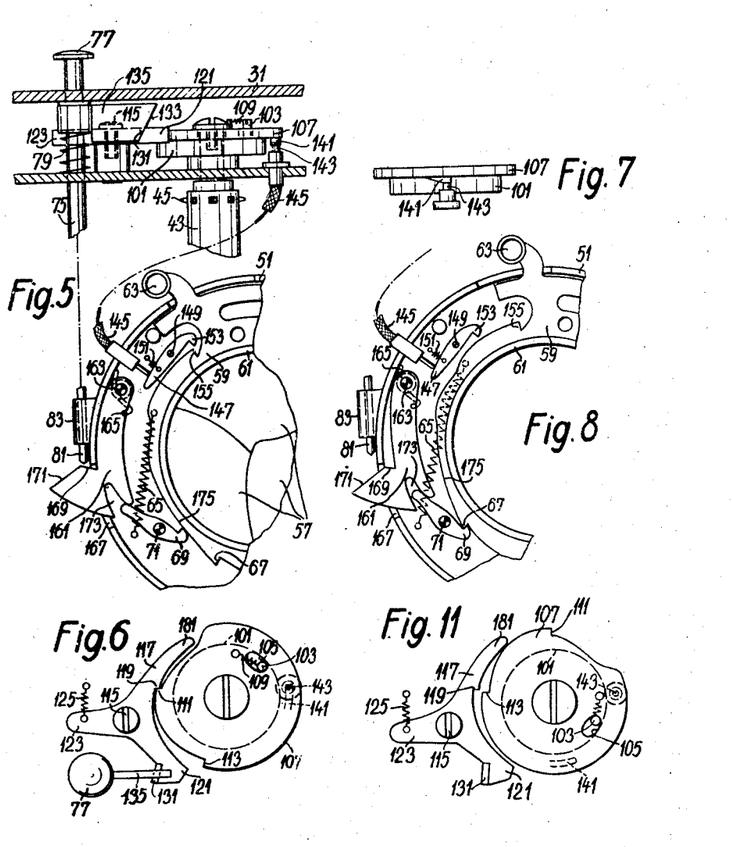
Figs. 5 and 6 are views similar to Figs. 2 and 3, respectively, with the parts in the position assumed when the film has been wound but with the shutter not yet tensioned.
Fig. 7 is a side elevation of certain parts shown in Figs. 5 and 6 in the same relative positions as in those figures, but viewed from a direction at right angles to the direction of Fig. 5.
Fig. 8 is a view similar to a fragment of Figs. 2 and 5, with the shutter setting member moved to its set or tensioned position.
Fig. 11 is a plan of the pawl and toothed disk shown in Figs. 3, 6, and 10 in a still different position.

The shutter is of the objective type and is enclosed within a casing 51, the camera lens 53 being mounted on the shutter casing. Except for the differences described below, the shutter may be of any known form, such, for example, as the form of shutter disclosed in United States Patent 1,687,123, granted October 9, 1928, for an invention of Deckel and Geiger. For instance, the shutter may include blades 57 (Fig. 2) corresponding to the shutter blades 12 of said Deckel and Geiger patent, and a master member 59 corresponding to the master member 5 of the Deckel and Geiger patent, and mounted for oscillation around the annular wall 61. The master member 59 is provided with an extension 63 passing through a slot in the shutter casing 51 to an accessible external position, and this extension constitutes a manually operable setting or tensioning member. When the setting member 63 is moved to the right from the position shown in Fig. 2, the master member 59 is oscillated in a clockwise direction, tensioning the motor spring 65 (corresponding to the motor spring 8 of the Deckel and Geiger patent) and at the completion of the clockwise setting movement, the master member is latched in set or tensioned position by engagement of the shoulder or tooth 67 on the master member with a hooked end of the latch 69, as shown in Fig. 8, which latch is pivoted in the shutter casing at 71 and corresponds in general to the latch 95 of said Deckel and Geiger patent. When this latch 69 is moved in a clockwise direction to release the shoulder or tooth 67, the master member 59 moves back in a counterclockwise direction from the position shown in Fig. 8 to the position shown in Fig. 2, opening and closing the shutter blades 57 during such counterclockwise movement in the manner fully described in said Deckel and Geiger patent and well known in the art.

In order to release or trip the shutter (to make an exposure) directly from a convenient position on the top of the camera casing 31, instead of having to reach around to the front of the camera to a point adjacent the shutter casing 51, there is provided a trip member in the form of a vertical rod 75 (Figs. 2 and 4) mounted in the shutter casing and extending out through the top thereof and having an accessible enlargement or knob 77 which may be depressed to move the rod downwardly against the action of a light spring 79 (Fig. 2) which constantly tends to move the rod upwardly. Another rod 81 is mounted for upward and downward reciprocation in a guide 83 secured to the shutter casing 51, which guide prevents lateral deflection of the rod and keeps it properly alined in position to cooperate with a release lever mounted in the shutter casing, as described later. The rod 75 is operatively connected to the rod 81 in such manner that depression of the former causes depression of the latter, through any suitable connecting means or linkage such as the lever system shown in Fig. 4, in which a lever 85, pivoted in the camera casing at 87, has one end engaging in a notch or recess in the rod 75 to be moved thereby and at its other end has a notch receiving a pin 89 on one end of the second lever 91 mounted on a pivot 93, the opposite end of the lever 91 engaging in a notch or recess in the rod 81.

The parts thus far described, except for some slight difference in the action of the spring 79 as will appear below, are common to all of the embodiments of the invention herein specifically disclosed. Referring now specifically to the first embodiment of the invention, shown in Figs. 2 to 11, inclusive, the upper end of the shaft or trunnion carrying the metering roll 43 has a disk 101 fixed rigidly to it to turn with the metering roll. A pin 103 fixed to this disk extends upwardly therefrom through a short arcuate slot 105 in a second disk 107 rotatably mounted on the upper end of the shaft or trunnion of the metering roll. A spring 109, connected at one end to the pin 103 and at the other end to the disk 107, tends constantly to turn the upper disk 107 in a clockwise direction relatively to the lower disk 101, so far as permitted by the length of the slot 105.

The upper or loose disk 107 has two teeth or shoulders 111 and 113 (Figs. 3, 6, and 10) for cooperation with a pawl pivoted at 115 and having three arms. The arm 117 of the pawl carries a shoulder or tooth 119 for cooperation with the tooth 111 of the disk, while the corner 121 of a second arm of the pawl constitutes a tooth or shoulder for cooperation with the tooth 113 of the disk. A third arm 123 is connected to a spring 125 which constantly tends to turn the pawl in a clockwise direction to throw the shoulder 119 against the periphery of the disk 107 and to move the shoulder 121 away from the periphery of the disk. The above mentioned second arm of the pawl, in addition to the shoulder 121, also is provided with a beveled surface 131 for cooperation with a beveled edge 133 (Figs. 2 and 5) on a member 135 fixed to the rod 75. When the release rod 75 is depressed, it carries the member 135 downwardly with it, and the inclined edge 133 thereof acts as a cam on the second arm of the pawl, turning the pawl in a counterclockwise direction against the action of the spring 125.

When the parts are all in readiness for making an exposure (that is, with the shutter set or tensioned and with a fresh section of film in proper place in the exposure window 41) the disk 107 and pawl are in the relative positions shown in Fig. 6, where the tooth 111 on the disk is against the shoulder 119 on the pawl, preventing the disk from turning any farther. The lower disk 101 has been turned until the pin 103 thereon is at the clockwise end of the slot 105, as shown in Fig. 6, and thus can turn no farther.

On the under surface of the loose disk 107 is a cam 141 (Figs. 6 and 7) which, when the disk is in the position shown in Fig. 6, overlies the upper end of a depressible plunger 143. This plunger is connected in any suitable manner, such as by a conventional flexible cable thrust device 145, to a latch member 147 (Figs. 2, 5, and 8) pivoted within the shutter casing at 149 and having a spring 151 which constantly tends to throw a hooked end 153 of the latch member against the periphery of the master member 59, so that, when the master member is in rest or run-down position, this hooked end 153 may engage a shoulder 155 on the master member.

When the cam 141 on the loose disk 107 is positioned directly over the end of the plunger 143, as in Figs. 5, 6, and 7, then this plunger 143 is depressed and, through the flexible connection 145, the latch 147 is swung against the action of the spring 151 to withdraw the hook 153 from the path of the shoulder 155 on the master member, thus leaving the master member unlocked or free to be tensioned. But whenever the cam 141 is in any other position, not directly over the plunger 143, then the spring 151 tends to shift the latch 147 into contact with the periphery of the master member 59, so that when the master member is in rest or untensioned position, the hook 153 will engage the shoulder 155 and lock the master member against tensioning or setting movement.

A shutter release lever 161 (Figs. 2, 5, 8, and 9) is pivoted in the shutter casing at 163 and is provided with a spring 165 tending constantly to turn this lever in a clockwise direction so that its lower left hand end projects to the maximum extent through a slot 167 in the shutter casing 51. The projecting end of the lever is provided with two inclined cam surfaces 169 and 171. A notch 173 in the release lever 161 receives one end of the latch lever 69.

Figures 1, 2, 3, 4:
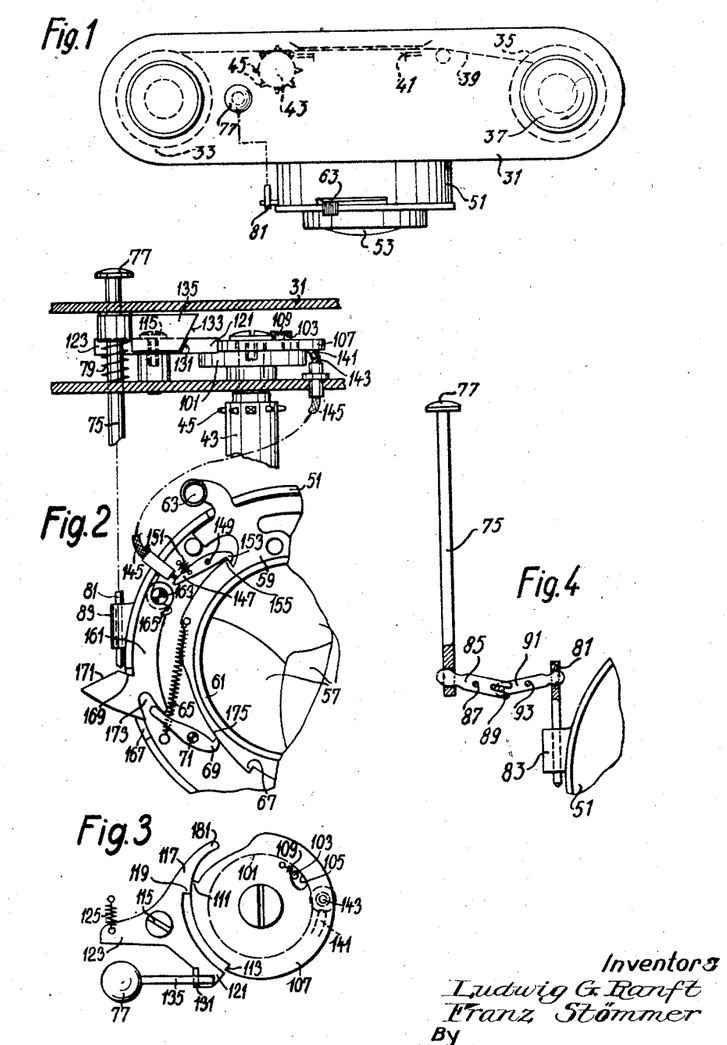
Fig. 1 is a plan view, somewhat schematic, of a camera constructed in accordance with the present invention.
Fig. 2 is a front view of a portion of the camera with certain parts omitted for clarity and with other parts in vertical section, illustrating one embodiment of the invention, with the parts in the rest position at the conclusion of an exposure.
Fig. 3 is a plan of part of the mechanism shown in Fig. 2, in the same position.
Fig. 4 is a diagrammatic view of the mechanism for tripping the shutter from a release member on the camera casing.

The periphery of the master member 59 is so shaped that the portion of the periphery which lies opposite the latch 69 when the master member is at rest or untensioned, is closer to the oscillatory axis of the master member (that is, the center of the annular wall 61) than the portion of the master member which is opposite the latch when the master member is tensioned. In other words, the periphery of the master member may be described as being cut away or recessed at 175, and it is this recessed portion thereof which lies opposite the end of the latch 69 when the master member is at rest as in Figs. 2 and 5. Because of this cut away or recessed shape of the master member 59, the latch 69 can move farther in a counterclockwise direction when the master member is in untensioned rest position, than when the master member is tensioned. In the tensioned or set position of the master member, the latch 69 can move no farther in a counterclockwise direction than the position shown in Fig. 8, and this position of the latch holds the release lever 161 in the position shown in Fig. 8, where the cam surface 169 is withdrawn inside the shutter casing, and where the cam surface 171 is in alinement with the release member 81 to cooperate therewith when the release member is depressed. But when the master member is in its untensioned rest position, then the latch 69 can swing farther in a counterclockwise direction, thus allowing the release lever 161 to swing farther outwardly under the influence of its spring 165, so that the cam surface 169, rather than the cam surface 171, is alined with the release plunger 81, as shown in Figs. 2 and 5. This cam surface 169 is sloped in the opposite direction from the cam surface 171, and if it is attempted to depress the release plunger 81 at this time, the plunger can be depressed only part way rather than all the way, and such depression will not have the effect of moving the release member 161 to releasing position.

The above described parts of this embodiment of the invention operate as follows: Assuming that the film has been wound and the shutter has been set or tensioned ready for a new exposure, the parts will be in the position shown in Figs. 6 and 8. To make the exposure, the operator now depresses the plunger 75, which causes downward movement of the release plunger 81 which comes down onto the inclined cam surface 171 of the release lever 161, and causes this release lever to swing inwardly (in a counterclockwise direction about its pivot 163) from the position shown in Fig. 8 to the position shown in Fig. 9. This inward motion of the release lever 161 swings the latch 69 in a clockwise direction about its pivot 71, releasing the nose of the latch from the shoulder 67 on the master member, as shown in Fig. 9, which allows the motor spring 65 of the master member to move the master member in a counterclockwise direction back to its initial untensioned position, opening and closing the shutter blades 57 during such movement, to make an exposure.

Figures 10, 13, 14:
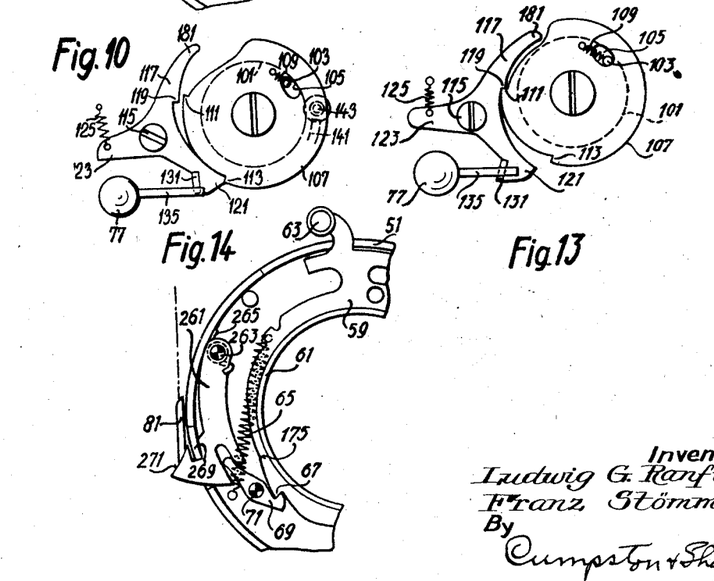
Fig. 13 is a plan of certain parts shown in Fig. 12, in the same position.
Fig. 14 is a view similar to a portion of Fig. 12, with the shutter set or tensioned ready for making the next exposure.

Simultaneously with the release of the latch 69, the downward motion of the plunger 75 also causes the inclined cam edge 133 on the plunger to press against the surface 131 of the pawl, swinging the shoulder 119 of the pawl away from the shoulder 111 of the loose disk 107 and bringing the shoulder 121 of the pawl into the path of the shoulder 113 of the disk, as shown in Fig. 10. This allows the spring 109 to turn the loose disk 107 a slight distance in a clockwise direction, until the tooth 113 hits against the shoulder 121. The shoulder 121 is so placed, however, that it stops the disk 107 before the end of the slot 105 in the disk hits against the pin 103, and thus the motion of the loose disk 107 does not jar the other disk 101 fixed to the metering roll 43, and does not cause any varying of the film during the exposure.

Figure 9:
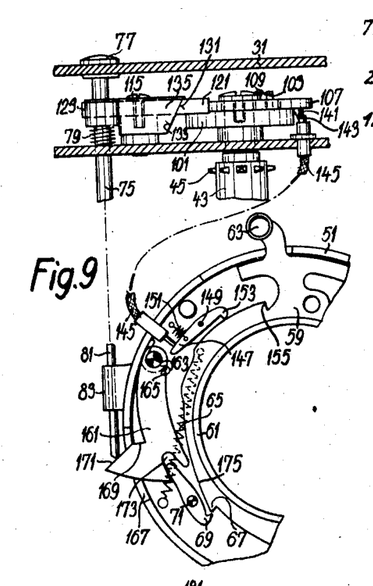
Figs. 9 and 10 are views similar to Figs. 2 and 3, respectively, with the shutter in the act of being released to make an exposure.

This slight motion of the loose disk 107 from the position of Fig. 6 to the position of Fig. 10 is sufficient to carry the cam 141 away from the plunger 143 so that the spring 151 may pull the locking pawl 147 against the periphery of the master member 59, as shown in Fig. 9, and when the master member reaches its initial untensioned position at the end of the exposure, the hook or nose 153 on this locking pawl will snap over the shoulder 155 on the master member, locking the master member in its untensioned position as shown in Fig. 2.

The operator releases the pressure on the plunger 75, so that the spring 79 causes this plunger to move upwardly again, and as the cam surface 133 moves upwardly, the spring 125 turns its pawl 123 in a clockwise direction to the position shown in Fig. 3, which withdraws the shoulder 121 from the tooth 113. At the completion of the exposure and when the plunger 75 has moved upwardly again, the parts are now in the position shown in Figs. 2 and 3.

The tensioning of the master member 59 is now impossible because the master member is locked by the pawl 147. A full actuation of the release member 75 is also impossible, because the release lever 161, now lying in the position of Fig. 2, prevents full downward movement of the plunger 75 and thus the operator, attempting to depress the plunger, will notice that the plunger can move only a slight distance rather than its normal distance downwardly and will be thereby notified that an exposure can not be made. The only operation possible at this time is the winding of the film, which is accomplished by grasping and turning the knob 37.

As this knob is turned, the film 39 is fed forwardly and causes the turning of the metering roller 43, which is now free to turn through approximately one full revolution. To prevent the tooth 113 from catching on the shoulder 119 as the metering roller is turned, the arm 117 of the control pawl has an extended end 181 and the periphery of the disk 107 is so shaped as to lie against this end in the manner shown in Fig. 11 and hold the shoulder 119 out of engagement with the periphery of the disk as the tooth 113 goes by. But when the other tooth 111 comes around to the shoulder 119, the extension 181 on the pawl no longer holds the shoulder away from the tooth, and thus the shoulder 119 engages the tooth 111 and stops the rotation of the disk 107 at the proper point. The other disk 101 and the roller 43 can turn a slight additional distance, until the pin 103 comes to the clockwise end of the slot 105, at which point rotation of the roller 43 and disk 101 is stopped. The film has now been fed the proper distance to bring the next exposure area into the exposure window 41, and no further feeding of the film is possible because the parts are locked by the shoulder 119 on the pawl. As the disk 107 comes around to its final position with the tooth 111 in contact with the shoulder 119, the cam 141 on the disk at the same time comes into contact with the plunger 143 and cams this plunger downwardly, which, through the flexible connection 145, swings the locking pawl 147 to remove its locking nose 153 from the shoulder 155 on the master member 59. This unlocks the master member so that it may be tensioned, but the film winding parts remain locked, and the release member 75 also remains locked against full actuation. The parts are now in the position shown in Figs. 5 and 6, and no operation is possible except the tensioning of the shutter.

The operator then tensions the shutter by moving the setting member 63 to the right or in a clockwise direction, until the latch 69 engages the shoulder 67 on the master member, and holds the master member in its set or tensioned position. During the tensioning of the master member, the latch pawl 69, riding up out of the recess 175, has moved somewhat in a clockwise direction from the position shown in Fig. 5 to the position shown in Fig. 8, and this draws the release lever 161 inwardly, against the action of its spring 165, removing the cam surface 169 from the path of the release plunger 81 and placing the cam surface 171 in the path of the release plunger. At the conclusion of the setting operation, the parts are now in the position shown in Figs. 6 and 8, and no other action is possible except a release of the shutter to make an exposure. The tensioning member 63 can not be further moved, and the film winding member 37 can not be further moved, but the release member 75 is now free to be depressed to make an exposure.

Thus it is seen that in the embodiment just described, the three different operations of winding the film, setting the shutter, and releasing the shutter to make an exposure, must always be performed in the sequence just named, the parts always being effectively locked against any other sequence of operation. Due to the interlocking mechanism, the camera is rendered practically "foolproof" so far as operation of the shutter and the film winding is concerned. It is not possible to make a double exposure; also it is not possible to perform by accident two film winding operations after one exposure, thus wasting film; and it is not possible to depress the release member fully and think that an exposure has been made, when in fact the shutter has not been tensioned.

An alternative embodiment of the invention will now be described, with reference to Figs. 12 to 19, inclusive. In this embodiment the film feeding control parts 101 to 135 may be of the same construction previously described with reference to the embodiment in Figs. 2 to 11, inclusive, and these parts bear the same respective reference numerals in Figs. 12 to 19 as in Figs. 2 to 11, so need not be further described. In this second embodiment, however, the cam 141 is omitted from the disk 107, and the plunger 143, flexible connection 145, and locking pawl 147 are also omitted. Moreover, the spring 79 used in the previousl embodiment to tend to move the plunger 75 upwardly, is replaced in this second embodiment by a spring 201 which is so placed that it tends constantly to thrust the plunger 75 downwardly instead of upwardly. However, this spring 201 is weaker than the spring 125 acting on the pawl arm 123, so that whenever the pawl is free to turn to its maximum extent in a clockwise direction, under the action of its spring 125, the cam surface 131 on the pawl will act upon the cam surface 133 on the plunger 75 and move this plunger upwardly against the action of the spring 201.

This second embodiment of the invention includes a release lever 261 pivoted in the shutter casing at 263 and urged outwardly (in a clockwise direction) by a spring 265, these parts corresponding in general to the parts 161, 163, and 165 of the embodiment previously described. But in this second embodiment, instead of having two inclined cam surfaces such as 169 and 171, the protruding end of the release lever 261 is provided with a locking notch 269 and with only one inclined cam surface, 271, corresponding in general to the surface 171 of the previous embodiment.

The spring 265 of the release lever 261 is made to have a stronger action on the release plunger system 81, 75, through the inclined cam surface 271, than the action of the spring 201 tending to move the plunger system downwardly. In other words, whenever the cam surface 271 is free to act on the plunger 81, the spring 265 will overcome the force of the spring 201 and will move the plungers 81 and 75 upwardly notwithstanding the downward pressure of the spring 201.

In this embodiment of the invention, the master member 59 is cut away or recessed at 175, just as in the previous embodiment, so that when the master member is in its untensioned rest position, the latch 69 is able to swing farther in a counterclockwise direction than when the master member is set or tensioned.

The parts, in this second embodiment of the invention, operate as follows: Assuming that an exposure has been made and that the film has been wound ready for the next exposure, but the shutter has not yet been tensioned, the parts will then be in the positions shown in Figs. 12 and 13. Due to the presence of the recess 175 on the master member opposite the end of the latch 69, the release lever 261 can be swung by its spring 265 to its maximum outward position, in which the inclined cam surface 271 is not alined with the release plunger 81, but on the contrary, the locking notch 269 is alined with the release plunger. The release plunger cannot be fully depressed now, because an attempt to depress it will simply cause it to move downwardly into the locking notch 269, and this notch is so shallow that the plunger can make only a partial downward movement, instead of being fully depressed, thus warning the operator that an exposure cannot be made. Further winding of the film is also impossible, because at this time the tooth 111 on the disk 107 lies against the shoulder 119 on the film control pawl, preventing further movement of the winding mechanism in the same manner as in the embodiment previously described. The only operation now possible is the tensioning of the shutter, which is accomplished by moving the shutter tensioning or setting member 63 in a rightward direction from the position shown in Fig. 12 to the position of Fig. 14.

Figure 12:
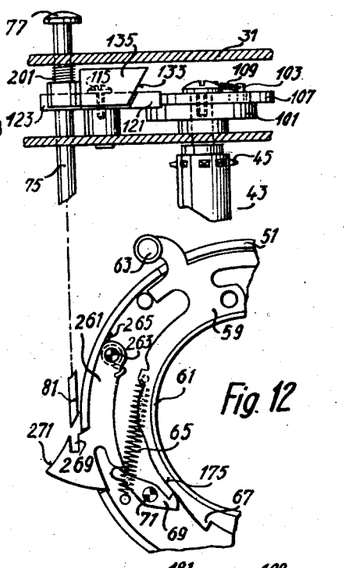
Fig. 12 is a front view of a portion of the camera, with certain parts omitted and with other parts in vertical section, illustrating a different embodiment of the invention and showing the parts in the position assumed when the film has been fed following one exposure but with the shutter not yet set or tensioned ready for the next exposure.

When the master member is tensioned, the latching pawl snaps over the shoulder 67 of the master member, as shown in Fig. 14, and the latching pawl now lies in a position turned a little clockwise from the position of Fig. 12, so that it holds the release lever 261 somewhat inwardly (or counterclockwise) from the position shown in Fig. 12, withdrawing the locking notch 269 from the path of the plunger 81, and placing the inclined cam surface 271 in the path of this plunger, all as indicated in Fig. 14.

Figure 15:
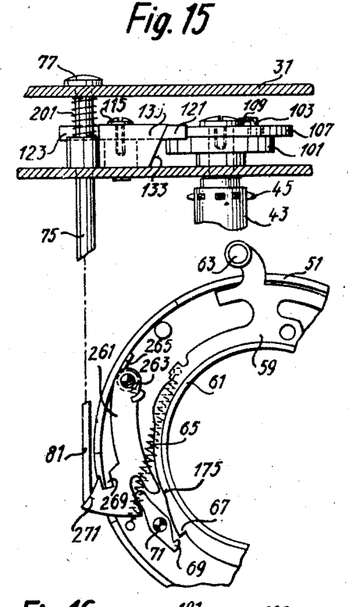
Figs. 15 and 16 are views similar to Figs. 12 and 13, respectively, with the shutter in the act of being released for making an exposure.
Figure 16:
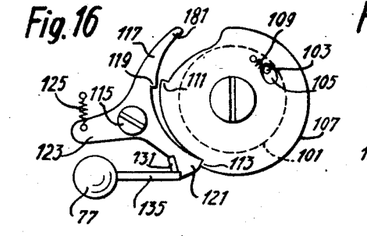
Figure 17:
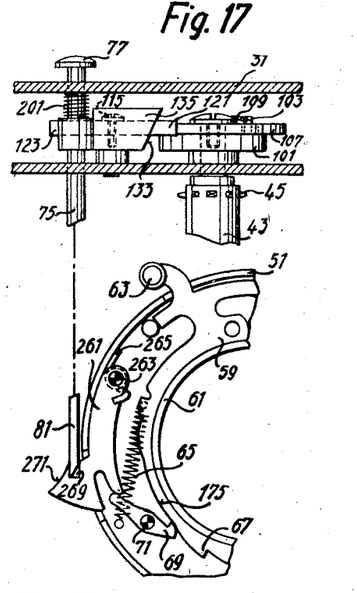
Figs. 17 and 18 are views similar to Figs. 12 and 13, respectively, showing the parts in the position assumed at the completion of an exposure.
Figure 18:
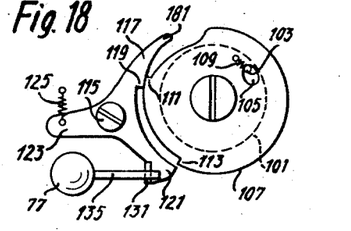

A further tensioning of the shutter is, of course, impossible and further operation of the film winding or feeding mechanism is likewise impossible, so that the only operation which can now be performed is to depress the release plunger 75 to make an exposure. As the plunger 75 moves downwardly, the corresponding downward movement of the connected plunger 81 acts upon the inclined cam surface 271 and forces the release lever 261 inwardly as illustrated in Fig. 15, swinging the latch 69 to its release position out of the way of the shoulder 67, thus releasing the master member so that it may move back from its tensioned position to its untensioned rest position under the influence of its motor spring 65, opening and closing the shutter blades during such movement to make an exposure. At the same time that the latch 69 is being released by the downward movement of the plunger 75, the cam surface 133 on this plunger also acts upon the surface 131 of the film control pawl and moves this pawl slightly in a counterclockwise direction from the position shown in Fig. 13 to the position of Fig. 16, withdrawing the shoulder 119 from the tooth 111 of the disk 107, and placing the shoulder 121 in the path of the tooth 113 of the disk. As in the case of the previous embodiment, this allows a slight clockwise movement of the disk 107 under the influence of its spring 109, but not sufficient movement to cause the end of the slot 105 to hit the pin 103, so no jarring of the film results. So long as the plunger 75 is held down by the downward pressure of the operator's finger on the knob 77, the locking parts remain in the positions shown in Figs. 15 and 16, and the master member, of course, moves leftwardly or counterclockwise from the position here shown.

When the operator releases the pressure on the knob 77 the spring 265 will move the release lever 261 outwardly with sufficient force to overcome the spring 201, so that the inclined surface 271 on the release lever will cam the plungers 75 and 81 upwardly until the upper end of the cam surface is moved past the lower end of the plunger 81. Then the plungers 75 and 81 will move downwardly under the influence of the spring 201, bringing the plunger 81 down into the locking notch 269 of the release lever, to the position shown in Fig. 17. Although the spring 125 is stronger than the spring 201, as above stated, yet the spring 125 is not free to act fully upon the plunger 75 at this time, for the film locking pawl can swing only partially in a clockwise direction to the position shown in Fig. 18, and cannot swing far enough to act on the cam 133 sufficiently to raise the plunger 81 out of the locking notch 269.

An operation of the release plunger is now impossible, as the plunger 81 is already at the bottom of the notch 269 and can move no further down, so if the operator attempts to depress the plunger to make an exposure, he will notice that it will not move downwardly and thus his attention will be directed to the fact that the camera is not ready for another exposure. Likewise, tensioning the shutter is impossible at this time, because the presence of the plunger 81 in the locking notch 269 prevents the release lever 261 from moving inwardly toward the center of the shutter, and since the release lever cannot move inwardly, the latching pawl 69 cannot swing in a clockwise direction about its pivot 71, and the presence of the end of the latching pawl 69 in the recess 175 of the master member prevents the master member from being turned in a clockwise or tensioning direction.

Figure 19:
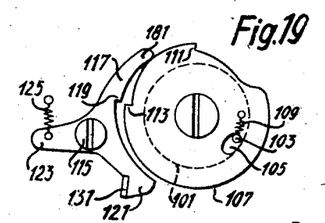
Fig. 19 is a plan similar to Figs. 13, 16, and 18 with the parts in a still different position.

Hence the only operation now possible is a film winding operation, which is accomplished as before by grasping the knob 37 and turning it. The movement of the film causes rotation of the metering roll 43, which as before carries the disk 107 around approximately one full revolution until further rotation is stopped by engagement of the tooth 111 with the shoulder 119 of the control pawl. The disk 107 is shaped to cooperate with an extension 181 on the control pawl as shown in Fig. 19, to prevent the shoulder 119 on the pawl from engaging the tooth 113 on the disk, just as in the case of the previously described embodiment.

At the completion of the winding operation, the disk 107 and the control pawl assume the positions shown in Fig. 13, and the pin 103 comes to rest against the clockwise end of the slot 105, preventing further rotation of the film winding member. The control pawl is now swung to its maximum clockwise position, under the influence of its spring 125, and since this spring, as above stated, is stronger than the spring 201, it acts upon the cam surface 133 to raise the plunger 75 against the action of the spring 201, to the fully raised position shown in Fig. 12.

The parts are now ready for tensioning the shutter, which is the only operation now possible. The shutter is then tensioned, which makes the parts ready for the releasing action to take an exposure, as above set forth.

It is seen that in this second embodiment of the invention, the release mechanism (that is, plungers 75 and 81) serves to control the locking of the shutter setting operation from the film winding parts, and it is not necessary, with this construction, to employ a separate lock controlling member such as the flexible cable 145 of the embodiment previously described.

In this second embodiment, as in the first embodiment, the operations of winding the film, setting the shutter, and releasing the shutter for exposure, must always take place in the sequence just named, and no other sequence of operation is possible, so that the operator is never left in doubt as to whether one or another of the necessary operations has been accidentally omitted. Likewise a second accidental winding of the film is prevented.

A third embodiment of the invention will now be described, referring to Figs. 20 to 24 of the drawings. In this third embodiment, as in the case of the two embodiments previously described, it is necessary to operate the shutter tensioning and release members and the film winding member in a predetermined sequence, but the sequence in this third embodiment is somewhat different from the sequence in the first and second embodiments. In the third embodiment, the film winding member cannot be operated until after the shutter has been tensioned. For this alternative sequence of operation, the interlocking action from the shutter to the winding mechanism may be transmitted either through a separate transmission device as in the case of the first embodiment described, or through the shutter release mechanism as in the case of the second embodiment described. It is believed sufficient to disclose an embodiment in which the locking is effected through the medium of the shutter release mechanism, for when this embodiment is understood, it is believed that it will be obvious, in view of the first embodiment described, how a separate transmission member could be employed if desired.

In the third embodiment (Figs. 20 to 24) the metering roll 43 is provided, as before, with a disk 101 fixed to it to turn therewith, but the loose disk 107 previously employed is here replaced by two disks 307 and 308 fixed rigidly to each other but both free to turn slightly relatively to the disk 101. As before, the disk 101 carries a pin 103 extending through a slot 305 in the disks 307 and 308, and connected to a spring 109 the same as before.

The disk 307 carries a tooth 311 corresponding in general to the tooth 111 previously described, and the upper disk 308 is provided with a notch or recess 313. The pawl 314, pivoted at 315, has a hook or nose 319 in the plane of the disk 307 for cooperation with the tooth 311, and has an end 321 in the plane of the disk 308 for cooperation with the notch 313. As before, the pawl includes an arm 323 corresponding to the previous arm 123, and connected to a spring 325 to tend to turn the pawl in a clockwise direction.

Figure 22:
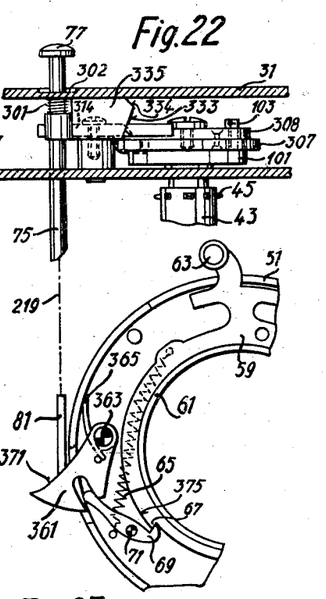
Figs. 22 and 23 are views similar to Figs. 20 and 21, respectively, with the shutter set or tensioned ready for the next exposure but with the film not yet fed to its new position.
Figure 23:
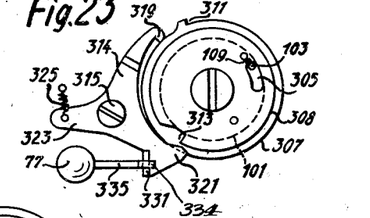
Figure 24:
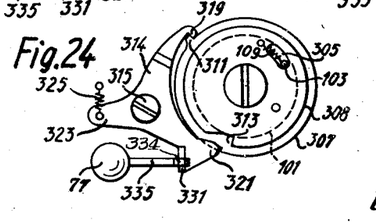
Fig. 24 is a view similar to Figs. 21 and 23, with the parts in the position assumed after the winding of the film has taken place so that the camera is now completely ready for the next exposure.

As before, the release plunger 75 carries a cam member 335 corresponding in general to the previous cam member 135. But this cam member, instead of having only a single cam surface 133, is here provided with two cam surfaces 333 and 334, the first sloping in the same direction as the previous cam surface 133, and the other sloping in the opposite direction, as best shown in Fig. 22. As the plunger 75 moves downwardly, the cam surface 333 pushes against the beveled surface 331 on one arm of the pawl 314 to turn this pawl in a counterclockwise direction against the force of the spring 325, but just before the plunger 75 and cam member 335 reach the downward limit of their travel, the inclined cam surface 333 passes beyond the lever 314 and the oppositely inclined cam surface 334 comes opposite the cooperating edge of the lever. The force of the spring 325 causing the pawl 314 to react against the cam surface 334, will therefore tend to hold the plunger 75 in its lowermost position and prevent it from springing upwardly again until a sufficient upward force is applied to the plunger so that the cam surface 334 may overcome the force of the spring 325.

The plunger 75 is provided with a spring 301 which, like the spring 201 in the second embodiment described, tends to move the plunger downwardly at all times. In the lowermost position of the plunger, the head or button 77 lies at least partially within a recess 302 formed in the top of the camera casing 31 so that the member 77 cannot be grasped and accidentally pulled upwardly when it should remain in its lowermost position.

In this embodiment the master member 59 is provided, as before, with a tooth or shoulder 67 cooperating with a latch 69, but the master member is not cut away or recessed at a point which is opposite the latch when the master member is in its untensioned rest position. On the contrary, the master member is so shaped, at 375, that when it is in its untensioned rest position, the latch 69 is held as shown in Fig. 20, in a position somewhat clockwise from the tensioned and latched position shown in Fig. 22.

The shutter release lever 361, corresponding in general to the release lever 161 previously described, is pivoted in the casing at 363 and is provided with a strong spring 365 tending to turn the lever in a clockwise direction and move the lower end thereof outwardly. The release lever is provided with an inclined cam surface 371 for cooperation with the lower end of the release plunger 81 which, as before, is operatively connected to the plunger 75.

Figure 20:
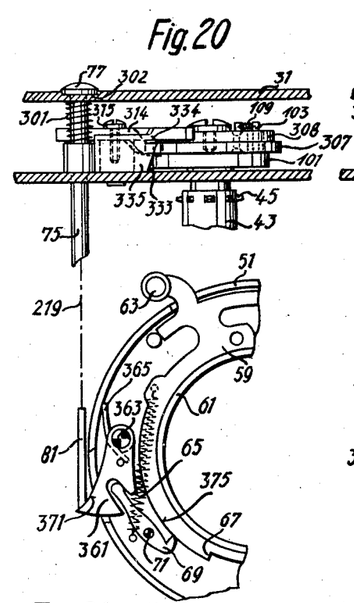
Fig. 20 is a front elevation of a portion of the camera, with certain parts omitted and with other parts in vertical section, illustrating still another embodiment of the present invention, with the parts in the position assumed at the completion of an exposure.
Figure 21:
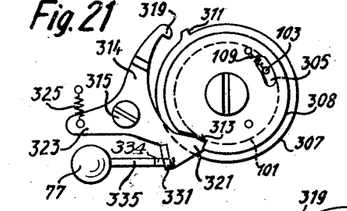
Fig. 21 is a plan of certain parts shown in Fig. 20, in the same position.

The action of these parts is as follows:

Assuming that an exposure has just been made, the parts come to rest in the positions shown in Figs. 20 and 21. The latch 69 cannot move farther in a counterclockwise direction for it is already in contact with the periphery of the master member, and consequently the latch does not allow the release lever 361 to move farther outwardly, so the release member cannot raise the plunger 81. Consequently the plungers 75 and 81 remain in their lowermost position, due not only to the downward thrust of the spring 301, but also to the effect of the spring 325 and pawl 314 upon the inclined cam surface 334. Since the release member 75 is already in its lowermost position, it cannot be actuated at this time and if the operator attempts to make another exposure by pressing on the release member, his attention is immediately directed to the fact that an exposure is impossible. The winding of the film at this time is also impossible because the end 321 of the pawl 314 lies in the notch 313 of the disk 308. Consequently the only operation possible at this time is the tensioning of the shutter, which is done as before by moving the tensioning or setting member 63 in a rightward direction to swing the master member 59 in a clockwise direction until the shoulder 67 engages the latch 69.

When the end of the latch 69 snaps over the shoulder 67 of the master member, the latch 69 moves somewhat in a counterclockwise direction, which allows the spring 365 to move the release lever 361 outwardly or in a clockwise direction from the position shown in Fig. 20 to the position of Fig. 22. This outward movement of the release lever thrusts the inclined cam surface 371 thereof against the bottom of the plunger 81 and forces this plunger upwardly against the action of the springs 301 and 325, since the spring 365 is made strong enough to overcome the combined effort of the springs 301 and 325. Early in its upward movement, the inclined cam surface 334 passes upwardly beyond the cooperating arm of the pawl 314 and from that point onwardly the pressure of the pawl 314, caused by the spring 325, reacts against the inclined surface 333 rather than the surface 334 and helps rather than hinders the upward motion of the plunger 75.

As the plunger 75 reaches the upper limit of its motion, the pawl 314 is permitted to swing clockwise under the influence of its spring 325, withdrawing the arm 321 from the notch 313 in the disk 308. As soon as the arm 321 is thus withdrawn, the spring 109 shifts the disk 308 slightly in a clockwise direction, bringing the notch 313 beyond the end of the pawl arm 321 to the position shown in Fig. 23. Depression of the release plunger 75 is now impossible, because such depression would produce a substantial counterclockwise movement of the pawl 314, and such movement is impossible because the notch 313 is no longer opposite the cam 321 and a very slight counterclockwise movement of the pawl 314 will turn the arm 321 into contact with the periphery of the disk. Thus if the operator attempts to depress the plunger 75, he will discover that it will not move downwardly through its normal extent, but can be depressed only to a slight extent, and thus he will be notified that the parts are not ready for an exposure.

Since the shutter is now tensioned and cannot be again tensioned, the only operation now possible is a film winding operation. As before, this is accomplished by turning the winding knob 37, which causes the metering roll 43 to turn and with it turn the disks 307 and 308 until the tooth 311 comes around to and is stopped by the shoulder 319 on the pawl 314. Shortly thereafter, the pin 103 comes into contact with the clockwise end of the recess 305, stopping further rotation of the metering roll 43, and feeding of the film must cease, the parts now being in the position shown in Fig. 24. The notch 313 is once more opposite the end 321 of the pawl, and the camera is now ready for taking an exposure.

As the plunger 75 is depressed in making the exposure, the connected plunger 81 presses against the inclined cam surface 371 of the release lever 361, and moves this lever inwardly, turning the latch 69 in a clockwise direction to release the shoulder 67 on the master member, so that the master member moves back in a counterclockwise direction to its initial rest position, opening and closing the shutter blades. At the same time, the downward movement of the plunger 75 and its connected cam member 335 produces, through the cam surface 333, a counterclockwise turning of the control pawl 314, removing the shoulder 319 from the tooth 311 and placing the portion 321 in the notch 313, so that the spring 109 produces a slight clockwise turning of the disks 307 and 308 until the end of the notch 313 comes against the arm 321. As before, the parts are so designed that at this time the end of the slot 305 will not come against the pin 103 and will not cause jarring of the film. After thus moving in a counterclockwise direction while it is being acted upon by the cam surface 333, the pawl 314 moves back slightly in a clockwise direction when the cam surface 334 comes into cooperation with the pawl, but this slight clockwise movement is not sufficient to withdraw the pawl from the notch 313, and the parts now remain in the positions shown in Figs. 20 and 21, with all operations locked or prevented except the setting or tensioning of the shutter, which is now possible.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. A photographic camera of the type including a manually operable film winding member, a separate manually operable shutter setting member for setting the shutter by a separate and distinct manual operation from that by which the film is wound, and shutter release means operable to make an exposure, characterized by the provision of interlocking means cooperating with said two members for preventing operation of one of them, following the making of an exposure, until the other has first been operated, and locking means controlled by that one of said members which is second to be operated, for locking said release means against full operation until said second operated member has been operated.

2. In a photographic camera of the type including a film winding member, a separate shutter setting member for setting the shutter by an operation separate and distinct from and non-simultaneous with that by which the film is wound, and shutter release means operable to make an exposure, the combination of mechanism controlled by one of said members for locking the other of said members against operation until said one of said members has first been operated, and mechanism controlled by said other member for locking said release means against full operation until said other member has been operated to complete the conditioning of said camera ready for making an exposure.

3. In a photographic camera of the type including film holding parts, a shutter, two separate manually operable conditioning members separately operable by separate non-simultaneous manual actuation, and a shutter release member, one of said conditioning members serving to advance film, one of said conditioning members serving to tension said shutter ready for an exposure, the combination of mechanism rendered effective by the making of an exposure for locking said release member and one of said conditioning members against full operation, mechanism actuated by operation of the other conditioning member for unlocking said one of said conditioning members while maintaining said release member locked against full operation, and mechanism actuated by operation of said one of said conditioning members for unlocking said release member.

4. A construction as described in claim 3, further including a rotatable toothed disk turning with the advancing film, and a pawl cooperating with said disk and with said release member for limiting the extent of turning thereof at each operating cycle.

5. A construction as described in claim 3, further including a rotatable toothed disk turning with the advancing film, and a pawl cooperating with said disk and with said release member for limiting the extent of turning thereof at each operating cycle, in which said release member includes an oblique cam edge cooperating with said pawl.

6. A construction as described in claim 1, further including a film metering roller, driven from the film winding or advancing member by the movement of the film or otherwise, a first disk fixed to said roller to turn therewith, a second disk spring-coupled to said first disk to tend to turn therewith but having limited play relative to the first disk, a tooth on said second disk, a pivoted pawl cooperating with said tooth, and a cam associated with said shutter release means and cooperating with said pawl to cause said pawl to release said tooth when said shutter release means is actuated.

7. In a photographic camera of the type including a main casing, film holding parts within said casing, a film feeding part, a rotatable film metering member turned by operation of said feeding part, and a shutter including a shutter tensioning member and a pivotally mounted shutter release lever, said tensioning member being operable as a separate act distinct from operation of said film feeding part, the combination of release means mounted at least partly on said main casing for operating said shutter release lever to make an exposure, and interlocking means cooperating with said metering member and said tensioning member to prevent operation of one of said members until the other has first been operated and cooperating with the second operated member and with said release means to prevent full operation of said release means until the second operated member has been operated.

8. In a photographic camera of the type including a main casing, film holding parts within said casing, a film feeding part, a rotatable film metering member turned by operation of said feeding part, and a shutter including a shutter tensioning member and a pivotally mounted shutter release lever, said tensioning member being operable as a separate act distinct from operation of said film feeding part, the combination of release means mounted at least partly on said main casing for operating said shutter release lever to make an exposure, a tooth associated with and turning with said metering member, a pawl cooperating with said tooth to stop rotation of said metering member at the end of a predetermined film feeding cycle, a cam operatively connected to said release means to retract said pawl from said tooth when said release means is operated, and interlocking means cooperating with said metering member and said tensioning member to prevent operation of one of said members until the other has first been operated and cooperating with said release means to prevent full operation of said release means until the second operated member has been operated.

9. In a photographic camera of the type including a main casing, film holding parts within said casing, a film feeding part, a rotatable film metering member turned by operation of said feeding part, and a shutter including a shutter tensioning member and a pivotally mounted shutter release lever having one position when the shutter is tensioned and a different position when the shutter is at rest in a run-down condition, said tensioning member being operable as a separate act distinct from operation of said film feeding part, the combination of release means mounted at least partly on said main casing for operating said shutter release lever to make an exposure, and interlocking means cooperating with said metering member and said tensioning member to prevent operation of one of said members during an operating cycle until the other has first been operated and cooperating with said release means to prevent full operation of said release means during said cycle until the second operated member has been operated, said interlocking means being dependent in part upon the position of said release lever.

10. In a photographic camera of the type including film holding parts, a shutter of the set type having a trip lever occupying one position when the shutter is set for making an exposure and occupying a different position when the shutter is at rest at the completion of an exposure, a shutter release member for operating said trip lever to make an exposure, and two manually and separately operable conditioning members, one serving to advance film and one serving to set said shutter ready for an exposure, the combination of mechanism rendered effective by the making of an exposure and controlled at least in part by the position of said trip lever for locking said release member and one of said conditioning members against full operation, mechanism actuated by operation of the other conditioning member for unlocking said one of said conditioning members while maintaining said release member locked against full operation, and mechanism actuated by operation of said one of said conditioning members for unlocking said release member.

11. A photographic camera including a camera body having thereon a manually operable member for winding film, a shutter having thereon a manually operable member movable from a rundown position to a tensioned position for tensioning the shutter as a separate act from winding the film, said shutter also having a shutter trip member movable from a rest position to an actuated position to release the tensioned shutter to make an exposure, said trip member occupying a different position when said shutter is run-down after the completion of an exposure from the rest position it occupies when said shutter is tensioned, a release plunger mounted on said camera body and depressible, when film has been wound and said shutter has been tensioned, to move said trip member from rest position to actuated position to make an exposure, means controlled by the position of said trip member after completion of an exposure for preventing effective actuation of said release plunger when said shutter is run down, and interlocking means preventing operation of a predetermined one of said two manually operable members until the other has first been operated after completion of an exposure.

12. A photographic camera including a camera body having thereon a manually operable member for winding film, a shutter having thereon a manually operable member movable from a rundown position to a tensioned position for tensioning the shutter as a separate act from winding the film, said shutter also having a shutter trip member movable from a rest position to an actuated position to release the tensioned shutter to make an exposure, said trip member occupying a different position when said shutter is run-down after the completion of an exposure from the rest position it occupies when said shutter is tensioned, a release plunger mounted on said camera body and depressible, when film has been wound and said shutter has been tensioned, to move said trip member from rest position to actuated position to make an exposure, means controlled by the position of said trip member after completion of an exposure for preventing effective actuation of said release plunger when said shutter is run down, and interlocking means preventing operation of said manually operable shutter tensioning member until said manually operable film winding member has first been operated after completion of an exposure.

13. A photographic camera including a camera body having thereon a manually operable member for winding film, a shutter having thereon a manually operable member movable from a rundown position to a tensioned position for tensioning the shutter as a separate act from winding the film, said shutter also having a shutter trip member movable from a rest position to an actuated position to release the tensioned shutter to make an exposure, said trip member occupying a different position when said shutter is run-down after the completion of an exposure from the rest position it occupies when said shutter is tensioned, a release plunger mounted on said camera body and depressible, when film has been wound and said shutter has been tensioned, to move said trip member from rest position to actuated position to make an exposure, means controlled by the position of said trip member after completion of an exposure for preventing effective actuation of said release plunger when said shutter is run down, and interlocking means acting jointly through said release plunger and said trip member for preventing operation of said manually operable shutter tensioning member until said manually operable film winding member has first been operated after completion of an exposure.

LUDWIG G. RANFT.
FRANZ STÖMMER.